(12) United States Patent
Takeda

(10) Patent No.: US 10,388,166 B2
(45) Date of Patent: Aug. 20, 2019

(54) VEHICLE CONTROL SYSTEM, VEHICLE CONTROL METHOD, AND VEHICLE CONTROL PROGRAM

(71) Applicant: Honda Motor Co., Ltd., Tokyo (JP)

(72) Inventor: Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 15/459,598

(22) Filed: Mar. 15, 2017

(65) Prior Publication Data

US 2017/0270799 A1 Sep. 21, 2017

(30) Foreign Application Priority Data

Mar. 15, 2016 (JP) ................................ 2016-051136

(51) Int. Cl.
| | | |
|---|---|---|
| *B62D 15/02* | (2006.01) | |
| *G08G 1/16* | (2006.01) | |
| *B60W 30/18* | (2012.01) | |
| *B60W 30/00* | (2006.01) | |

(52) U.S. Cl.
CPC ............. *G08G 1/167* (2013.01); *B60W 30/00* (2013.01); *B60W 30/18163* (2013.01); *B62D 15/02* (2013.01); *B62D 15/0255* (2013.01)

(58) Field of Classification Search
CPC ........................ B60W 30/18163; G08G 1/167; B62D 15/02; B62D 15/0255
See application file for complete search history.

(56) References Cited

U.S. PATENT DOCUMENTS

| | | | | |
|---|---|---|---|---|
| 9,616,925 B2* | 4/2017 | Spero | ........................ | B62D 1/28 |
| 9,718,473 B2* | 8/2017 | Suzuki | ................... | B60W 30/16 |
| 9,731,713 B2* | 8/2017 | Horii | ..................... | B60W 30/00 |
| 10,108,195 B2* | 10/2018 | Silvlin | ................ | G05D 1/0088 |
| 2016/0039459 A1* | 2/2016 | Spero | ........................ | B62D 1/28 |
| | | | | 701/25 |
| 2016/0068156 A1* | 3/2016 | Horii | ..................... | B60W 30/00 |
| | | | | 701/28 |
| 2016/0297447 A1* | 10/2016 | Suzuki | ................... | B60W 30/16 |
| 2017/0102705 A1* | 4/2017 | Silvlin | ................ | G05D 1/0088 |
| 2018/0215387 A1* | 8/2018 | Takae | ..................... | B60K 31/00 |
| 2018/0215389 A1* | 8/2018 | Takae | ..................... | B60R 21/00 |
| 2018/0222423 A1* | 8/2018 | Takae | ..................... | G08G 1/167 |
| 2018/0319403 A1* | 11/2018 | Buburuzan | ........ | B62D 15/0255 |

FOREIGN PATENT DOCUMENTS

JP 2009-78735 A 4/2009

\* cited by examiner

*Primary Examiner* — Peter D Nolan
(74) *Attorney, Agent, or Firm* — Westerman, Hattori, Daniels & Adrian, LLP

(57) ABSTRACT

A vehicle control system includes a detection section that detects a nearby vehicle traveling in the vicinity of a vehicle, a prediction section that predicts positions at plural future points in time for the nearby vehicle detected by the detection section, a derivation section that derives boundary positions for the vehicle at the plural future points in time so as to provide a margin on a side encroaching on a lane change target area of the vehicle with respect to the positions of the nearby vehicle predicted by the prediction section for the plural future points in time, and a course generation section that generates a target course for changing lanes based on the boundary positions of the vehicle derived by the derivation section for the plural future points in time.

14 Claims, 11 Drawing Sheets

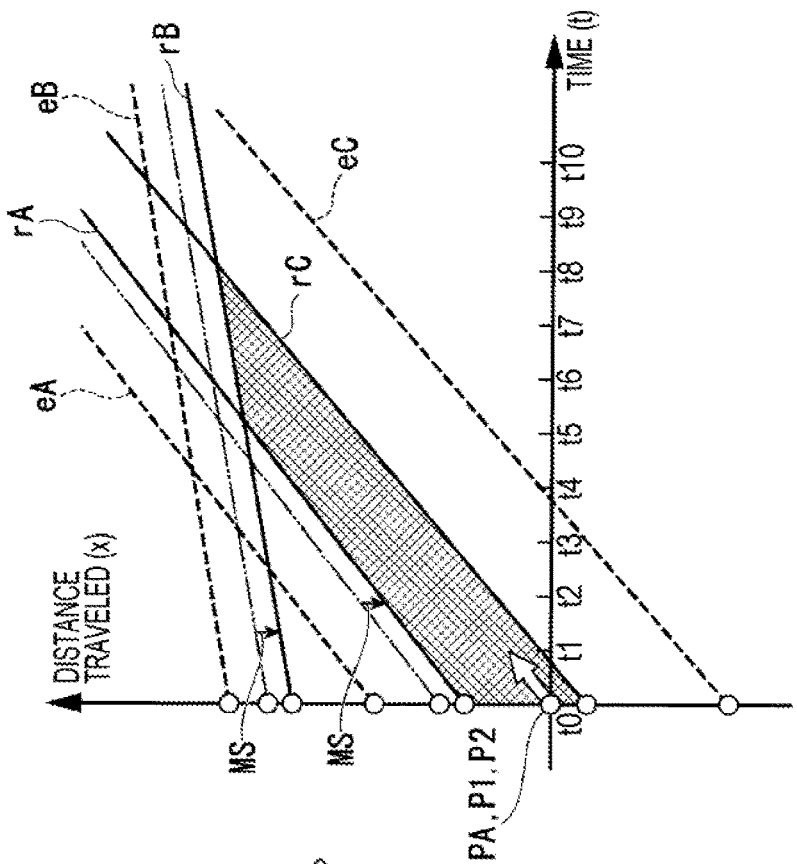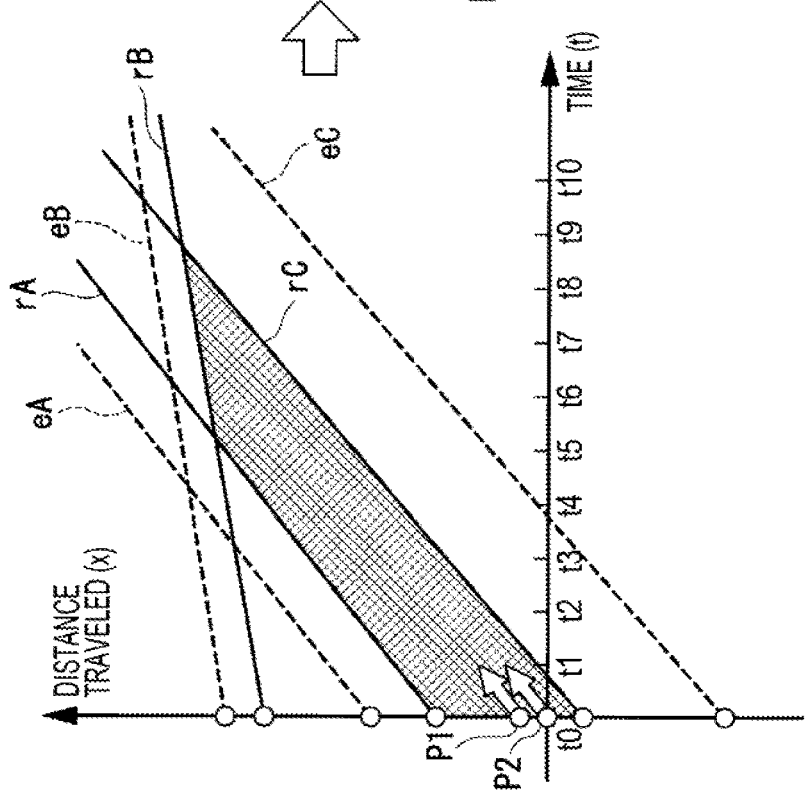

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-051136, filed Mar. 15, 2016, entitled "Vehicle Control System, Vehicle Control Method, and Vehicle Control Program." The contents of this application are incorporated herein by reference in their entirety.

BACKGROUND

1. Field

The present disclosure relates to a vehicle control system, a vehicle control method, and a vehicle control program.

2. Description of the Related Art

A known drive support apparatus includes a support start section that starts support for lane changing, a detection section that detects a relative distance and relative speed between a vehicle and another vehicle, a derivation section that derives a collision risk degree relating to the other vehicle when the vehicle changes lanes based on the relative distance and the relative speed, a first determination section that determines whether or not lane change is possible based on the relative distance, the relative speed, and the collision risk degree, a decision-making section that decides a target space for changing lanes based on the relative distance and the relative speed when lane changing is not possible, a second determination section that determines whether or not the target space has sufficient space to enable lane changing, a setting section that sets a target speed toward a lane change standby position when there is not sufficient space, and that sets a target speed toward a lane change possible position in cases in which there is sufficient space, and a control section that controls the speed of the vehicle so as to attain the target speed (see, for example, Japanese Unexamined Patent Application Publication No. 2009-78735).

This related technology is capable of changing lanes safely. However, ever-higher vehicle safety levels are desirable. There are some cases in which vehicle safety could be further increased when generating a lane change target course.

SUMMARY

The present application describes a vehicle control system, a vehicle control method, and a vehicle control program capable of further raising safety levels.

A first aspect describes a vehicle control system including a detection section that detects a nearby vehicle traveling in the vicinity of a vehicle; a prediction section that predicts positions at plural future points in time for the nearby vehicle detected by the detection section, a derivation section that derives boundary positions for the vehicle at the plural future points in time so as to provide a margin (a margin area) on a side encroaching on a lane change target area of the vehicle with respect to the positions of the nearby vehicle predicted by the prediction section for the plural future points in time, and a course generation section that generates a target course for changing lanes based on the boundary positions of the vehicle derived by the derivation section for the plural future points in time.

A second aspect describes the first aspect, wherein as the boundary positions, the derivation section derives current-lane front boundary positions provided with a vehicle-in-front rearward margin at a rear side of positions at the plural future points in time of a vehicle in front traveling immediately ahead of the vehicle in a current lane, adjacent-lane front boundary positions provided with a front-reference-vehicle rearward margin at a rear side of positions at the plural future points in time for a front reference vehicle traveling immediately ahead of the lane change target area in an adjacent lane adjacent to the current lane, and adjacent-lane rear boundary positions provided with a rear-reference-vehicle forward margin at a front side of positions at the plural future points in time of a rear reference vehicle traveling immediately behind the lane change target area in the adjacent lane. The course generation section generates the target course based on the current-lane front boundary position, the adjacent-lane front boundary position, and the adjacent-lane rear boundary position derived by the derivation section.

A third aspect describes the first aspect, further including a setting section that sets a size of the margin based on at least one out of a state of the vehicle or a state of the nearby vehicle. The derivation section derives the boundary position for the vehicle at the plural future points in time by providing the margin at the size set by the setting section.

A fourth aspect describes the third aspect, wherein the setting section sets the size of the margin based on at least one out of a speed of the vehicle, a speed of the nearby vehicle, or a relative speed between the vehicle and the nearby vehicle.

A fifth aspect describes the fourth aspect, wherein the setting section derives a first margin amount (size) based on a time-to-collision obtained by dividing an inter-vehicle distance between the vehicle and the nearby vehicle in a direction of vehicle progress by the relative speed; derives a second margin amount (size) based on a time-headway obtained by dividing the inter-vehicle distance between the vehicle and the nearby vehicle in the direction of vehicle progress by the speed of the vehicle; and sets the size of the margin based on at least one out of the first margin amount or the second margin amount.

A sixth aspect describes the fifth aspect, wherein the setting section compares the first margin amount against the second margin amount, and sets the size of the margin based on whichever is the larger out of the first margin amount or the second margin amount.

A seventh aspect describes the fifth aspect, wherein the setting section sets the size of the margin based on a weighted sum of the first margin amount and the second margin amount.

An eighth aspect describes the third aspect, wherein the setting section sets the size of the margin based on a vehicle width direction movement amount of the vehicle required in order to avoid a vehicle in front traveling immediately ahead of the vehicle in a current lane.

A ninth aspect describes the third aspect, wherein the setting section sets the size of the margin based on behavior of the nearby vehicle.

A tenth aspect describes the first aspect, further including a setting section that sets a size of the margin based on a vehicle class of the nearby vehicle. The derivation section derives the boundary positions for the vehicle at the plural future points in time by providing the margin at the size set by the setting section.

An eleventh aspect describes the first aspect, further including a setting section that sets a size of the margin based on an environment in which the vehicle is traveling. The derivation section derives the boundary positions for the vehicle at the plural future points in time by providing the margin at the size set by the setting section.

A twelfth aspect describes the eleventh aspect, wherein the setting section sets the size of the margin based on a magnitude relationship between an average speed in a current lane, and an average speed in an adjacent lane adjacent to the current lane.

A thirteenth aspect describes a vehicle control method performed by a vehicle computer, the vehicle control method including detecting a nearby vehicle traveling in the vicinity of a vehicle, predicting positions at plural future points in time for the detected nearby vehicle, deriving boundary positions for the vehicle at the plural future points in time so as to provide a margin on a side encroaching on a lane change target area of the vehicle with respect to the predicted positions of the nearby vehicle for the plural future points in time, and generating a target course for changing lanes based on the derived boundary positions of the vehicle for the plural future points in time.

A fourteenth aspect describes a vehicle control program including causing a vehicle computer to detect a nearby vehicle traveling in the vicinity of a vehicle, predict positions at plural future points in time for the detected nearby vehicle, derive boundary positions for the vehicle at the plural future points in time so as to provide a margin on a side encroaching on a lane change target area of the vehicle with respect to the predicted positions of the nearby vehicle for the plural future points in time, and generate a target course for changing lanes based on the derived boundary positions of the vehicle for the plural future points in time.

According to the first, thirteenth, and fourteenth aspects, the target course for lane changing is generated based on the boundary positions provided with the margin with respect to the positions of the nearby vehicle at the plural future points in time. This thereby enables a target course to be generated with more leeway at the plural future points in time, thereby enabling a further increase in lane changing safety.

According to the second aspect, appropriate boundary positions are set behind the vehicle in front in the current lane, behind the front reference vehicle in the adjacent lane, and ahead of the rear reference vehicle in the adjacent lane. This thereby enables a target course to be generated with more leeway with respect to various nearby vehicles traveling in the current lane and the adjacent lane, thereby enabling a further increase in lane changing safety.

According to the third to the twelfth aspects, the size of the margin is set based on at least one out of a state of the vehicle (speed, acceleration, or the like), a state of the nearby vehicle (speed, acceleration, behavior, or the like), the size of the nearby vehicle (vehicle width, vehicle class, or the like), and the environment in which the vehicle is traveling (lane category, road gradient, tightness of curve, weather conditions, road surface conditions, visibility conditions, or the like). The size of the margin is thus set flexibly according to various conditions, generating a safer target course. The word "section" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 12A is a diagram illustrating an example of a relationship between vehicle reference points and nearby vehicles at a current point in time and at plural future points in time, according to the first modified example of the second embodiment.

FIG. 12B is a diagram illustrating an example of a relationship between vehicle reference points and nearby vehicles at a current point in time and at plural future points in time, according to the first modified example of the second embodiment.

DESCRIPTION OF THE PREFERRED EMBODIMENTS

Explanation follows regarding embodiments of a vehicle control system, a vehicle control method, and a vehicle control program of the present disclosure, with reference to the drawings.

First Embodiment

Vehicle Configuration

Figure 1:
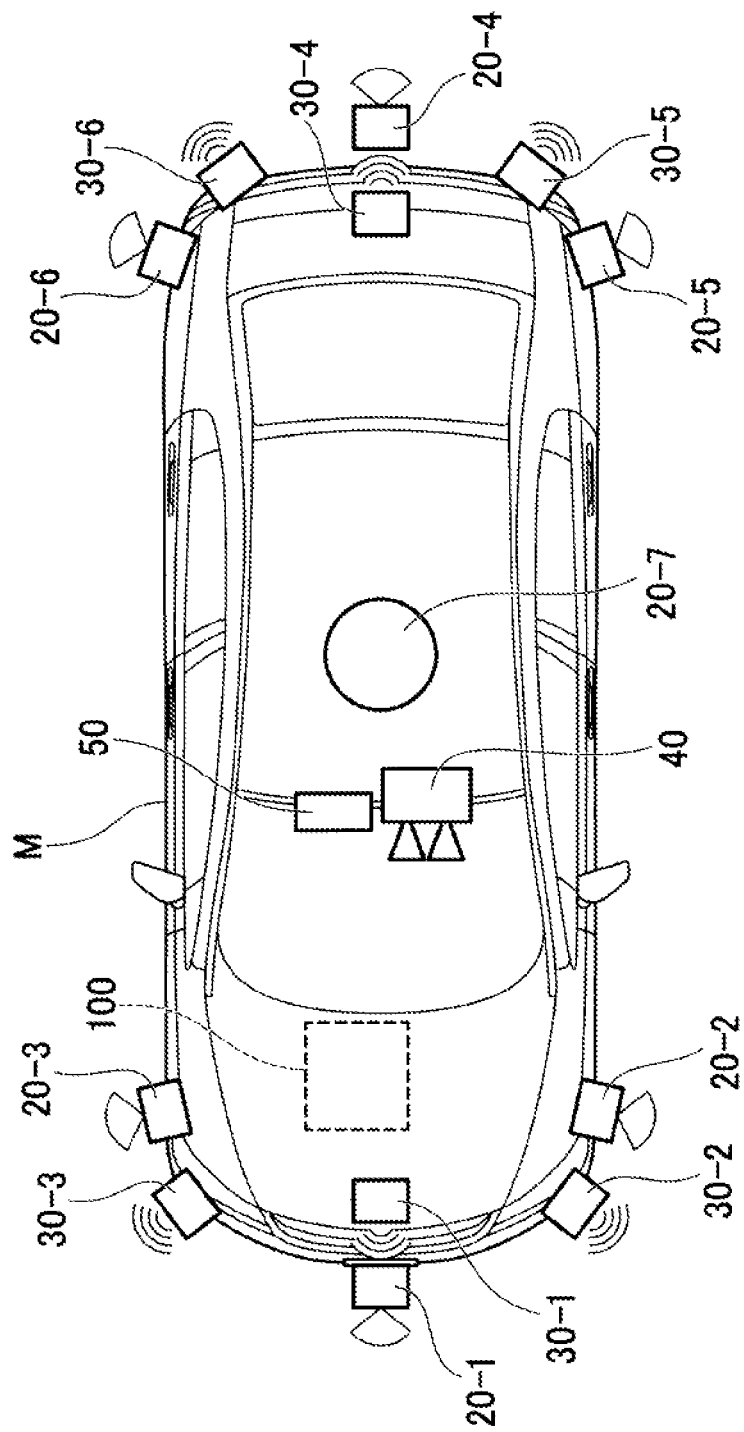
FIG. 1 is a diagram illustrating configuration elements of a vehicle installed with a vehicle control system according to a first embodiment.

FIG. 1 is a diagram illustrating configuration elements of a vehicle (referred to below as the vehicle M) installed with a vehicle control system 100 according to a first embodiment. The vehicle installed with the vehicle control system 100 is, for example, a two, three, or four-wheeled automobile; and encompasses automobiles with a diesel or gasoline internal combustion engine as a motive power source, electric vehicles with an electric motor as a motive power source, and hybrid vehicles including both an internal combustion engine and an electric motor as motive power sources. Such electric vehicles are driven using electric power discharged from a battery such as a secondary battery, a hydrogen fuel cell, a metal fuel cell, or an alcohol fuel cell.

As illustrated in FIG. 1, the vehicle is installed with sensors such as finders 20-1 to 20-7, radars 30-1 to 30-6, and a camera 40; a navigation device 50; and the vehicle control system 100 described above. The finders 20-1 to 20-7 are, for example, Light Detection and Ranging, or Laser Imaging Detection and Ranging (LIDAR) sensors that measure scattering of illuminated light to measure the distance to a target. For example, the finder 20-1 is attached to a front grill; and the finders 20-2 and 20-3 are attached to side faces of the vehicle body, door mirrors, inside front lights, or in the vicinity of side lights. The finder 20-4 is attached to a trunk lid or the like, and the finders 20-5 and 20-6 are attached to side faces of the vehicle body or inside tail lights. The finders 20-1 to 20-6 described above have, for example, a detection range of approximately 150° in a horizontal direction. The finder 20-7 is attached to the roof, for example. The finder 20-7 has, for example, a detection range of approximately 360° in the horizontal direction.

The radars 30-1 and 30-4 described above are, for example, long range millimeter wave radars that have a wider detection range than the other radars in a depth direction. The radars 30-2, 30-3, 30-5, and 30-6 are intermediate range millimeter wave radars that have a narrower detection range than the radars 30-1 and 30-4 in the depth direction. In the following, the finders 20-1 to 20-7 are denoted simply as the "finders 20" when no particular distinction is being made, and the radars 30-1 to 30-6 are denoted simply as "radars 30" when no particular distinction is being made. The radars 30 detect objects using a frequency-modulated continuous-wave (FM-CW) method, for example.

The camera 40 is, for example, a digital camera utilizing a solid-state imaging element such as a charge-coupled device (CCD) or a complementary metal-oxide-semiconductor (CMOS) element. The camera 40 is attached, for example, to an upper portion of a front windshield or to the back face of a rear view mirror. The camera 40 periodically and repeatedly images ahead of the vehicle M, for example.

Note that the configuration illustrated in FIG. 1 is merely an example, and parts of this configuration may be omitted, or other configurations may be added.

Figure 2:
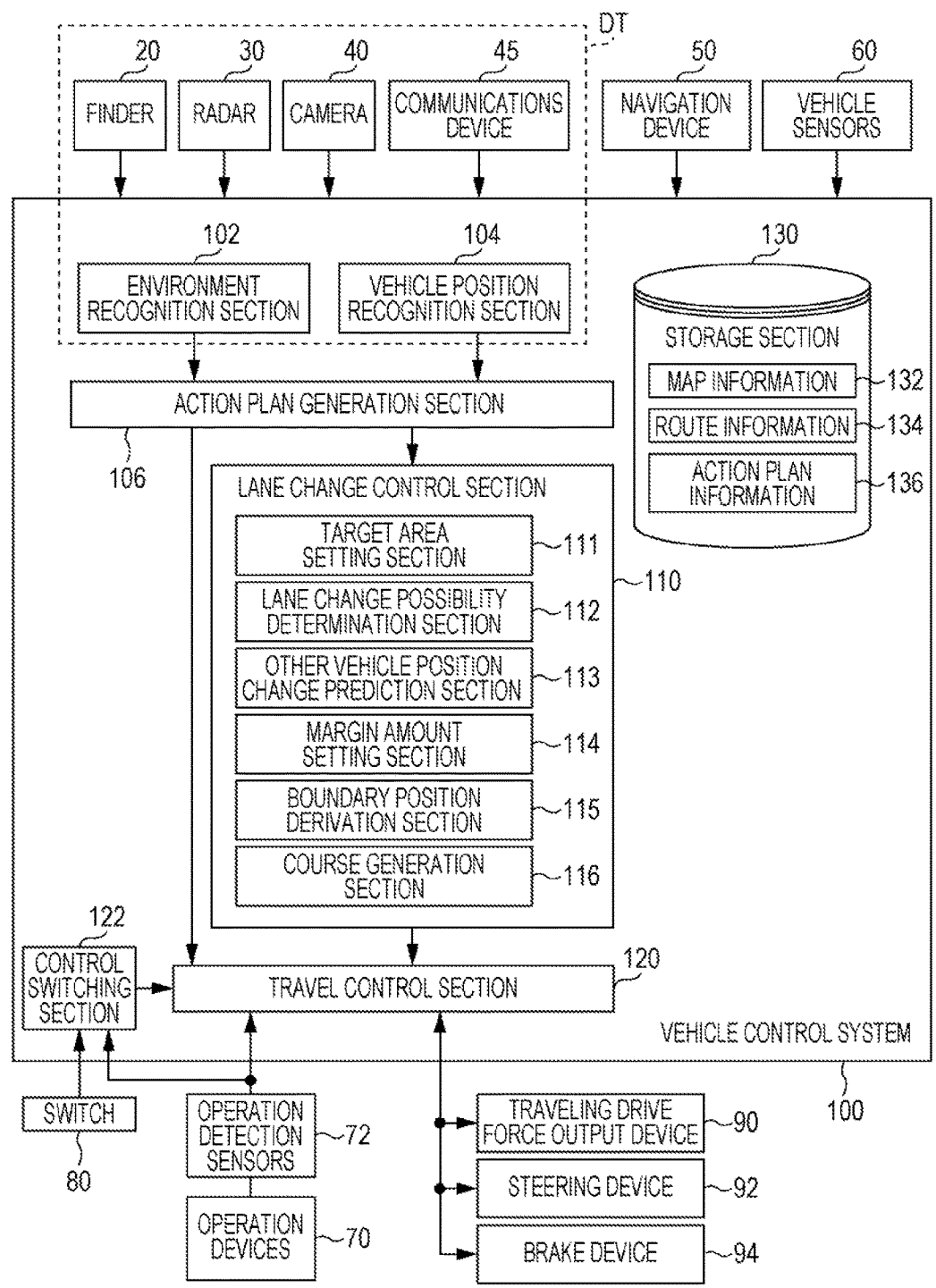
FIG. 2 is a functional configuration diagram of a vehicle, focusing on a vehicle control system according to the first embodiment.

FIG. 2 is a functional configuration diagram of the vehicle M, focusing on the vehicle control system 100 according to the first embodiment. In addition to the finders 20, the radars 30, and the camera 40, the vehicle M is installed with a communications device 45, the navigation device 50, vehicle sensors 60, operation devices 70, operation detection sensors 72, a switch 80, a traveling drive force output device 90, a steering device 92, a brake device 94, and the vehicle control system 100.

The communications device 45 includes an antenna and a wireless circuit that is electrically connected to the antenna. The communications device 45 acquires information relating to the environment in which the vehicle M is traveling, such as weather conditions, road surface conditions, and visibility conditions, by wireless communication with communications satellites or communications devices installed on the road. The communications device 45 may be implemented in part or in whole by one function of a terminal device such as a smartphone or a tablet terminal in the possession of a user. In such cases, information is exchanged using wireless or wired communication between the terminal device and the vehicle control system 100.

The navigation device 50 includes a global navigation satellite system (GNSS) receiver and map information (navigation map), a touch-panel display device that functions as a user interface, a speaker, a microphone, and the like. The navigation device 50 identifies the position of the vehicle M using the GNSS receiver, and derives a route from this position to a destination designated by a user. The route derived by the navigation device 50 is stored in a storage section 130 as route information 134. The position of the vehicle M may be identified, or supplemented, by using an inertial navigation system (INS) that utilizes output from the vehicle sensors 60. While the vehicle control system 100 is executing a manual driving mode, the navigation device 50 provides guidance using sounds and navigational display of the route to the destination. Note that configuration for identifying the position of the vehicle M may be provided independently of the navigation device 50. The navigation device 50 may be implemented, for example, by one function of a terminal device such as a smartphone or a tablet terminal in the possession of a user. In such cases, information is exchanged using wireless or wired communication between the terminal device and the vehicle control system 100.

The vehicle sensors 60 include, for example, a vehicle speed sensor that detects the speed of the vehicle M (vehicle speed), an acceleration sensor that detects acceleration, a yaw rate sensor that detects angular acceleration about a vertical axis, and a direction sensor that detects the orientation of the vehicle M.

The operation devices 70 include, for example, an accelerator pedal, a steering wheel, a brake pedal, and a shift lever. Operation detection sensors 72 that detect the presence or absence of operation and an amount of operation by a driver are attached to the operation devices 70. The operation detection sensors 72 include, for example, an accelerator opening sensor, a steering torque sensor, a brake sensor, and a shift position sensor. The operation detection sensors 72 output the degree of accelerator opening, steering torque, brake depression amount, shift position, and the like to the travel control section 120 as detection results. Note that, alternatively, the detection results of the operation detection sensors 72 may be output directly to the traveling drive force output device 80, the steering device 92, or the brake device 94.

The switch 80 is a switch operated by a driver or the like. The switch 80 may be a mechanical switch, or may be a graphical user interface (GUI) switch provided to the touch-panel display device of the navigation device 50. The switch 80 receives instructions to switch between a manual driving mode in which the driver drives manually, and a self-driving mode to travel in a state in which the driver does not perform operations (or operates by a smaller amount, or less frequently, than in the manual driving mode), and generates a control mode designation signal designating a control mode by a travel control section 120 to be either the self-driving mode or the manual driving mode.

The traveling drive force output device 90 includes one or both out of an engine or a traction motor, for example. In cases in which the traveling drive force output device 90 only includes an engine, the traveling drive force output device 90 further includes, for example, an engine Electronic Control Unit (ECU) that controls the engine. For example, the engine ECU adjusts a throttle opening amount and a shift gear according to information input from the travel control section 120, so as to control the traveling drive force (torque) for vehicle travel. When the traveling drive force output device 90 only includes a traction motor, the traveling drive force output device 90 includes a motor ECU that drives the traction motor. The motor ECU, for example, adjusts the duty ratio of a PWM signal applied to the traction motor so as to control the traveling drive force for vehicle travel. When the traveling drive force output device 90 includes both an engine and a traction motor, both the engine ECU and the motor ECU work together in coordination with each other to control traveling drive force.

The steering device 92 includes, for example, an electric motor that applies force to a rack and pinion mechanism or the like to enable changing of the orientation of a steering wheel, and a steering angle sensor that detects a steering wheel angle (or actual steering angle). The steering device 92 drives the electric motor according to information input from the travel control section 120.

The brake device 94 includes, for example, a master cylinder to which brake operation performed using the brake pedal is transmitted as hydraulic pressure, a reservoir tank that holds brake fluid, and brake actuators that adjust braking force output to the respective wheels. The brake device 94 controls the brake actuators and the like according to information input from the travel control section 120, so as to output a braking torque of a desired magnitude to the respective wheels. Note that the brake device 94 is not limited to a hydraulically actuated electronically controlled braking device such as described above, and may be an electronically controlled braking device actuated by electric actuators.

Vehicle Control System

Explanation follows regarding the vehicle control system 100. The vehicle control system 100 includes, for example, an environment recognition section 102, a vehicle position recognition section 104, an action plan generation section 106, a lane change control section 110, the travel control section 120, a control switching section 122, and the storage section 130. Some or all of the environment recognition section 102, the vehicle position recognition section 104, the action plan generation section 106, the lane change control section 110, the travel control section 120, and the control switching section 122 are software functional sections whose functions are implemented by a processor, such as a central processing unit (CPU), executing a program. Moreover, some or all of these sections may be implemented by hardware functional sections using Large-Scale Integration (LSI), Application Specific Integrated Circuits (ASIC), or the like. The storage section 130 may be implemented by read-only memory (ROM), random-access memory (RAM), a hard disk drive (HDD), flash memory, or the like. The program may be pre-stored in the storage section 130, or may be downloaded from an external device using onboard internet equipment or the like. The program may also be installed in the storage section 130 by loading a portable storage medium stored with the program into a drive device, not illustrated in the drawings.

The environment recognition section 102 recognizes states (position, speed, acceleration, behavior, and the like) of nearby vehicles, and the size of the nearby vehicles (vehicle width, vehicle class, and the like), based on the output of the finders 20, the radars 30, the camera 40, and the like. In the present embodiment, a nearby vehicle refers to a vehicle traveling in the vicinity of the vehicle M, and traveling in the same direction as the vehicle M. The positions of nearby vehicles may be indicated by representative points, such as the centers of mass or corners of the other vehicles, or may be indicated by regions expressed by the outlines of the other vehicles. The "behavior" of a nearby vehicle may include whether or not the nearby vehicle is changing lanes (or attempting to change lanes). For example, the environment recognition section 102 recognizes whether or not the nearby vehicle is changing lanes (or attempting to change lanes) based on past positions of the nearby vehicle, the position of the nearby vehicle with respect to a boundary between its current lane and an adjacent lane, or an actuation state of a direction indicator. Moreover, the "behavior" of a nearby vehicle may include whether or not the nearby vehicle has a stable travel state. A stable travel state is a state in which the travel of the nearby vehicle does not weave in the vehicle width direction, and the brake is not being operated frequently.

The environment recognition section 102 may also detect an average vehicle speed of a nearby vehicle traveling in the current lane, and an average vehicle speed of a nearby vehicle traveling in an adjacent lane, based on the output of the finders 20, the radars 30, the camera 40, and the like. In addition to nearby vehicles, the environment recognition section 102 may also recognize the positions of guard rails, utility poles, parked vehicles, pedestrians, and other objects. Hereafter, the finders 20, the radars 30, the camera 40, and the environment recognition section 102 are also referred to collectively as a "detection section DT" that detects the nearby vehicles. The detection section DT may also recognize the state of nearby vehicles (position, speed, acceleration, behavior, and the like) and the size of nearby vehicles (vehicle width, vehicle class, and the like) by communicating with the nearby vehicles.

The environment recognition section 102 recognizes the state of the environment in which the vehicle M is traveling based on information acquired through the communications device 45, for example. For example, the environment recognition section 102 recognizes weather conditions (such as rain or snow conditions), road surface conditions (such as wet or frozen road surface conditions), visibility conditions (such as fog or smog conditions), and the like, based on information acquired through the communications device 45. Note that the environment recognition section 102 may, for example, recognize weather conditions, road surface conditions, visibility conditions, and the like based on the output of the camera 40 and the like. The detection section DT of the present embodiment is also a detection section that detects states of the environment in which the vehicle M is traveling. The communications device 45 configures part of the detection section DT.

Figure 3:
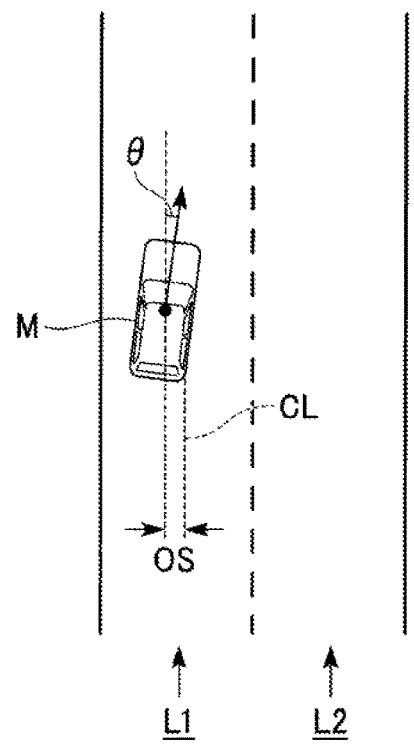
FIG. 3 is a diagram illustrating how a relative position of a vehicle with respect to a lane of travel is recognized by a vehicle position recognition section.

The vehicle position recognition section 104 recognizes states of the vehicle M (position, speed, acceleration, and the like) based on map information 132 stored on the storage section 130; and information input from the finders 20, the radars 30, the camera 40, the navigation device 50, or the vehicle sensors 60. For example, the vehicle position recognition section 104 may recognize representative points, such as the center of mass or corners of the vehicle M, as the position of the vehicle M; or may recognize a region expressed by the outline of the vehicle M as the position of the vehicle M. Moreover, the vehicle position recognition section 104 recognizes the lane in which the vehicle M is traveling (current lane), and the relative position of the vehicle M with respect to the current lane, based on information of the various devices described above. The map information 132 is, for example, map information that is more precise than the navigation map included in the navigation device 50, and includes information relating to lane centers, information relating to lane boundaries, or the like. FIG. 3 is a diagram illustrating how the position of the vehicle M relative to the lane of travel is recognized by the vehicle position recognition section 104. The vehicle position recognition section 104 recognizes, for example, a deviation OS of a reference point (for example, the center of mass) of the vehicle M from a lane-of-travel center CL, and an angle θ formed between the direction of progress of the vehicle M and a line parallel to the lane-of-travel center CL, as the relative position of the vehicle M with respect to the lane of travel. Note that, alternatively, the vehicle position recognition section 104 may recognize the position of the vehicle M reference point with respect to either of the side edges of the lane of travel as the relative position of the vehicle M with respect to the lane of travel.

The map information 132 stored in the storage section 130 (or a navigation map of the navigation device 50) may, for example, include information such as lane categories (categories such as driving lane, passing lane, and climbing lane), the gradient of the road, and the tightness of curves. The vehicle position recognition section 104 may recognize the lane category of the lane in which the vehicle M is traveling, the road gradient, the tightness of curves, and the like based on the map information 132 (or the navigation map of the navigation device 50), and information input from the finders 20, the radars 30, the camera 40, the navigation device 50, or the vehicle sensors 60. The vehicle position recognition section 104 configures part of the detection section DT that detects states of the environment in which the vehicle M is traveling.

The action plan generation section 106 generates an action plan for specific road sections. The specific road sections are, for example, road sections in the route derived by the navigation device 50 passing through toll roads such as expressways. Note that there is no limitation thereto, and the action plan generation section 106 may generate action plans for freely selected road sections.

The action plan is, for example, configured by plural events that are sequentially executed. Events include, for example, a deceleration event in which the vehicle M is decelerated, an acceleration event in which the vehicle M is accelerated, a lane keep event in which the vehicle M is driven so as to not deviate from the lane of travel, a lane change event in which the lane of travel is changed, a passing event in which the vehicle M is caused to overtake a vehicle in front, a junction event in which the vehicle M is caused to change to a desired lane at a junction point or the vehicle M is driven so as to not deviate from the current lane of travel, and a merge event in which the vehicle M is accelerated or decelerated at a lane merging point and the lane of travel is changed. For example, in cases in which a junction (junction point) is present on a toll road (for example, an expressway or the like), it is necessary for the vehicle control system 100 to change lanes such that the vehicle M progresses in the direction of the destination, or maintains its lane, in the self-driving mode. Accordingly, in cases in which the map information 132 is referenced and a junction is determined to be present on the route, the action plan generation section 106 sets a lane change event between the current position (coordinate) of the vehicle M and the position (coordinate) of the junction in order to change lanes into a desired lane that enables progression in the direction of the destination.

Figure 4:
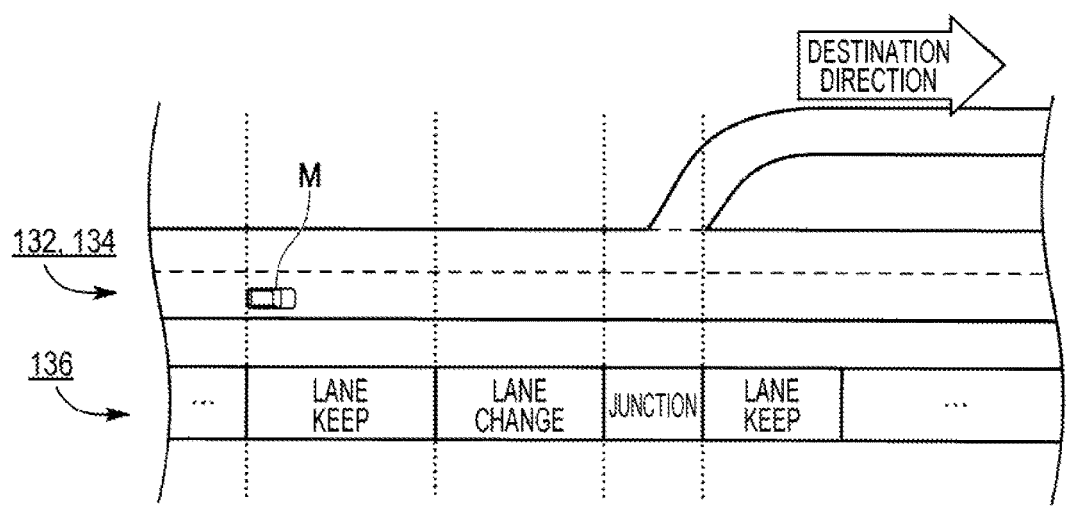
FIG. 4 is a diagram illustrating an example of an action plan generated for specific road sections.

FIG. 4 is a diagram illustrating an example of an action plan generated for given road sections. As illustrated in FIG. 4, the action plan generation section 106 classifies situations that arise when traveling along a route to a destination, and generates an action plan such that events adapted to each situation are executed. Note that the action plan generation section 106 may dynamically change the action plan according to changes in the situation of the vehicle M.

Lane Change Event

The lane change control section 110 performs control in order to execute a lane change event included in the action plan generated by the action plan generation section 106. As illustrated in FIG. 2, the lane change control section 110 includes, for example, a target area setting section 111, a lane change possibility determination section 112, an other vehicle position change prediction section 113, a margin amount setting section 114, a boundary position derivation section 115, and a course generation section 116. Note that the lane change control section 110 may perform the processing described below in order to execute a junction event or a merge event.

Figure 5:
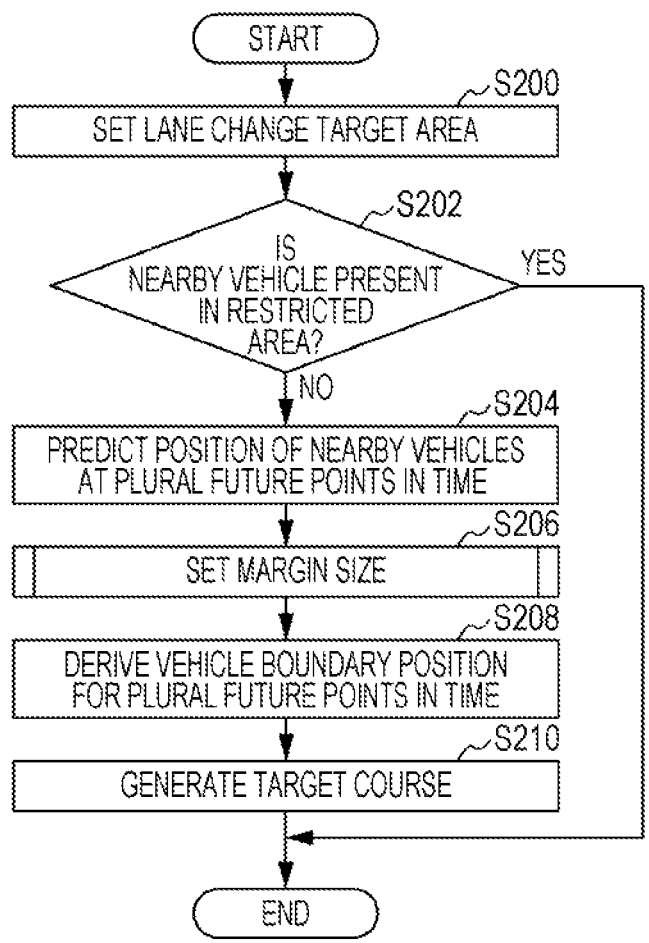
FIG. 5 is a flowchart illustrating an example of a flow of processing to generate a course by a lane change control section according to the first embodiment.

Explanation follows regarding processing to perform lane change course generation, with reference to a flowchart. FIG. 5 is a flowchart illustrating an example of a flow of processing to perform lane change course generation.

Target Area Setting

First, the target area setting section 111 sets a target area for changing lanes (lane change target area) (step S200). For example, the target area setting section 111 refers to the positions of any nearby vehicles detected by the detection section DT, and sets the lane change target area (referred to below simply as the "target area") as a relative position with respect to a nearby vehicle traveling in an adjacent lane adjacent to the current lane.

Figure 6:
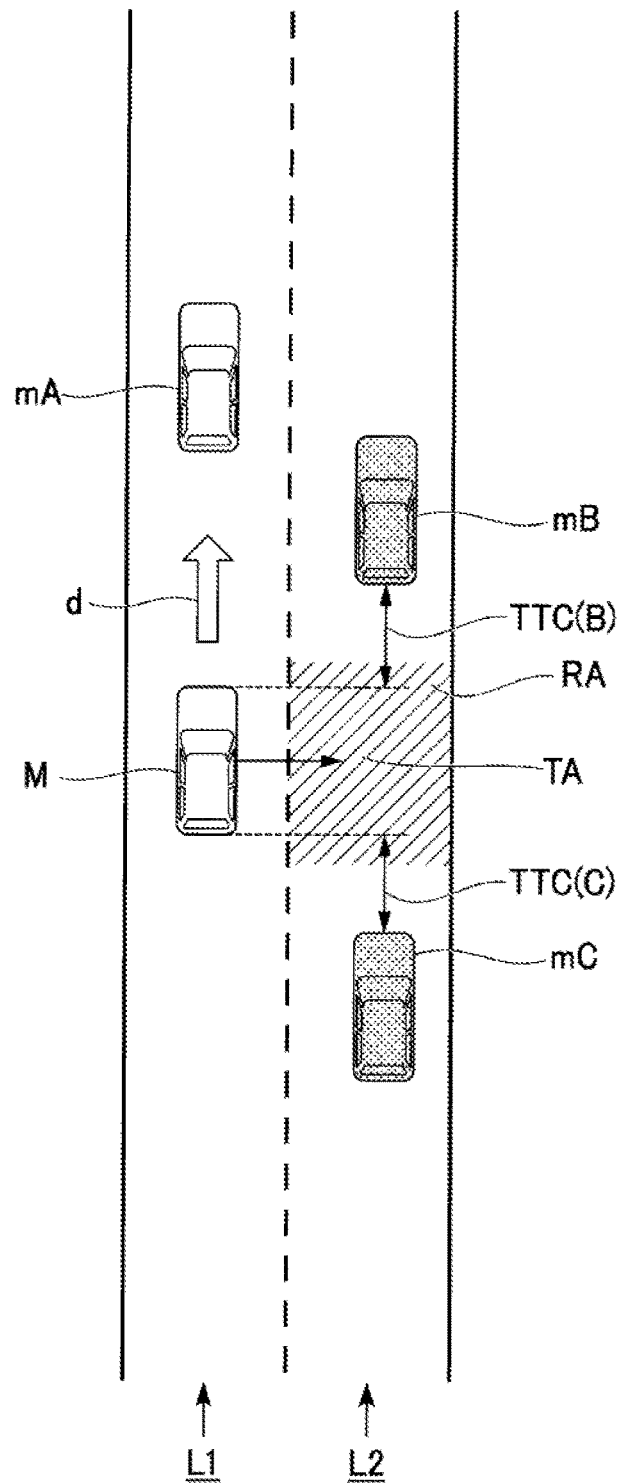
FIG. 6 is a diagram illustrating how a target area setting section sets a target area in the first embodiment.

FIG. 6 is a diagram illustrating how the target area setting section 111 sets a target area TA. In FIG. 6, L1 is the current lane in which the vehicle M is traveling, L2 is an adjacent lane adjacent to the current lane L1, and d is the direction of vehicle progress. In the following explanation, the action plan instructs a lane change into the adjacent lane L2 that is adjacent on the right side of the current lane L1. Moreover, in FIG. 6, mA is a vehicle in front traveling immediately ahead of the vehicle M in the current lane L1, mB is a front reference vehicle traveling immediately ahead of the target area TA in the adjacent lane L2, and mC is a rear reference vehicle traveling immediately behind the target area TA in the adjacent lane L2. The vehicle in front mA, the front reference vehicle mB, and the rear reference vehicle mC are each examples of nearby vehicles.

For example, the target area setting section 111 identifies a vehicle traveling in the adjacent lane L2 and traveling ahead of the vehicle M (the front reference vehicle mB), and a vehicle traveling in the adjacent lane L2 and traveling behind the vehicle M (the rear reference vehicle mC); and sets the target area TA between these vehicles. Note that alternatively, the front reference vehicle mB may be a vehicle traveling behind the vehicle M.

Lane Change Possibility Determination

Next, the lane change possibility determination section 112 sets a restricted area RA, for example, by projecting the vehicle M into the lane change target adjacent lane L2, adding a slight leeway to the front and rear. For example, the restricted area RA is set as a region extending from one edge to the other edge of the adjacent lane L2 in the vehicle width direction. The lane change possibility determination section 112 then determines whether or not part of a nearby vehicle is present inside the restricted area RA (step S202). When part of a nearby vehicle is present inside the restricted area RA (step S202: YES), the lane change possibility determination section 112 ends the lane change processing. However, when no nearby vehicles are present inside the restricted area RA (step S202: NO), the following lane change processing is performed. Note that in the determination of step S202, the lane change possibility determination section 112 may further determine whether or not a time-to-collision TTC (B) between a virtual front end of the vehicle M projected onto the lane change destination, and the front reference vehicle mB; and a time-to-collision TTC (C) between a virtual rear end of the vehicle M projected onto the lane change destination, and the rear reference vehicle mC; both satisfy preset conditions. The lane change possibility determination section 112 may end lane change processing if one or more of the time-to-collision TTC (B) and the time-to-collision TTC (C) do not meet the conditions. The time-to-collision TTC will be described later.

Position Change Prediction for Nearby Vehicles

Next, the other vehicle position change prediction section 113 predicts positions for the vehicle in front mA, the front reference vehicle mB, and the rear reference vehicle mC at plural future points in time (t1, t2, t3, ... ) (step S204). Note that in the following explanation, the vehicle in front mA, the front reference vehicle mB, and the rear reference vehicle mC are also referred to collectively as the nearby vehicles mA, mB, mC.

The positions of the nearby vehicles mA, mB, mC at the plural future points in time may be predicted based on a constant speed model that assumes that the nearby vehicles mA, mB, mC will continue to travel at their current speeds, based on a constant acceleration model that assumes the nearby vehicles mA, mB, mC will continue to travel at their current accelerations, or based on various other models. Moreover, the other vehicle position change prediction section 113 may consider the steering angles of the nearby vehicles mA, mB, mC, or may predict their change in position without considering steering angle on the assumption that the vehicles will travel so as to maintain their current lanes of travel. In the following explanation, positional changes in the nearby vehicles mA, mB, mC are predicted on the assumption that the nearby vehicles mA, mB, mC will continue to travel at their current speeds and maintaining their lanes of travel.

Figure 7:
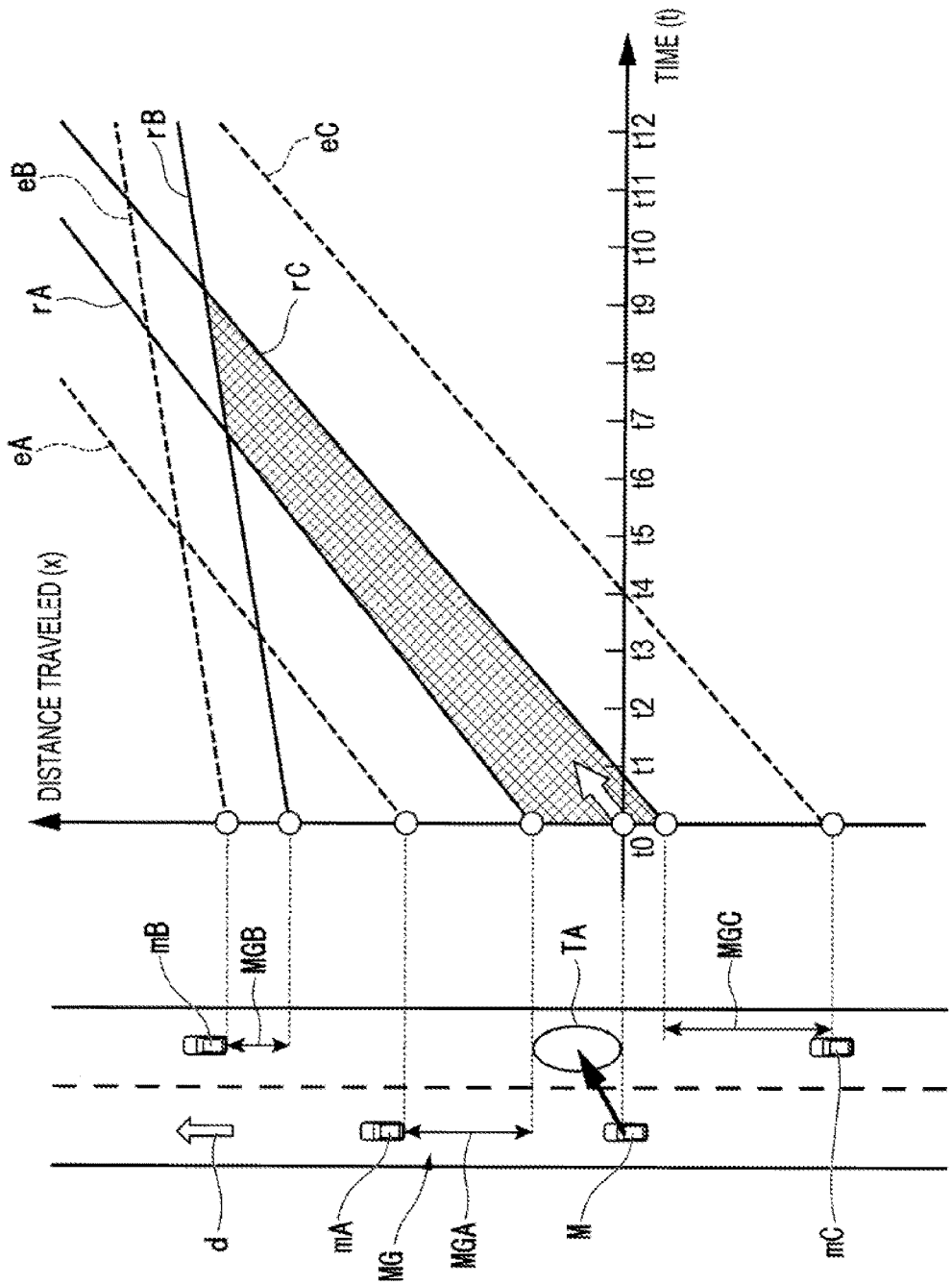
FIG. 7 is a diagram illustrating a relationship between a vehicle and nearby vehicles at a current point in time and at plural future points in time.

FIG. 7 is a diagram illustrating an example of a relationship between the vehicle M and the nearby vehicles mA, mB, mC at a point in time when the lane change event begins (referred to below as the current point in time) (t0), and at plural future points in time (t1, t2, t3, ... ). In FIG. 7, the vertical axis shows a distance travelled x in the direction of vehicle progress d with reference to the position of the vehicle M at the current point in time (t0), and the horizontal axis shows elapsed time t from the current point in time (t0).

The dashed line eA represents the position of the vehicle in front mA at the plural future points in time (t1, t2, t3, ... ) as predicted by the other vehicle position change prediction section 113. Similarly, the dashed line eB represents the position of the front reference vehicle mB at the plural future points in time (t1, t2, t3, ... ) as predicted by the other vehicle position change prediction section 113. The dashed line eC represents the position of the rear reference vehicle mC at the plural future points in time (t1, t2, t3, ... ) as predicted by the other vehicle position change prediction section 113. Note that although the positions of the nearby vehicles mA, mB, mC at the plural future points in time (t1, t2, t3, ... ) are schematically represented by the dashed lines eA, eB, and eC in FIG. 7, in reality they are collections of plural points along the dashed lines eA, eB, and eC.

Margin Setting

In the present embodiment, with respect to the positions of the nearby vehicles mA, mB, mC at the plural future points in time as predicted by the other vehicle position change prediction section 113, the boundary position derivation section 115 sets margins MG as leeway in the inter-vehicle distance on the side encroaching on the target area TA. In other words, the margins MG are margins that narrow an enterable region of the vehicle M with respect to the dashed lines eA, eB, and eC described above. Moreover, the boundary position derivation section 115 derives regions provided with the margins MG with respect to the positions of the nearby vehicles mA, mB, mC at the plural future points in time as the enterable region of the vehicle M at the plural future points in time.

For example, as illustrated in FIG. 7, the margins MG include a vehicle-in-front rearward margin MGA set behind the vehicle in front mA, a front-reference-vehicle rearward margin MGB set behind the front reference vehicle mB, and a rear-reference-vehicle forward margin MGC set in front of the rear reference vehicle mC. The vehicle-in-front rearward margin MGA is a margin set between the vehicle M and the vehicle in front mA in the current lane L1. For example, the vehicle-in-front rearward margin MGA is a margin of a maximum approachable distance of the vehicle M toward the rear of the vehicle in front mA. The front-reference-vehicle rearward margin MGB is a margin set between the target area TA and the front reference vehicle mB in the adjacent lane L2. For example, the front-reference-vehicle rearward margin MGB is a margin of an appropriate inter-vehicle distance between the front reference vehicle mB and the vehicle M when the vehicle M is traveling so as to follow behind the front reference vehicle mB. The rear-reference-vehicle forward margin MGC is a margin set between the target area TA and the rear reference vehicle mC in the adjacent lane L2. For example, the rear-reference-vehicle forward margin MGC is a margin of a maximum approachable distance of the vehicle M toward the front of the rear reference vehicle mC.

Margin Amount Setting

Detailed explanation follows regarding a flow when setting the margins MG. First, the margin amount setting section 114 sets the size of the margins MG (step S206). Note that step S206 for setting the size of the margins MG may be performed at approximately the same time as step S204, or may be performed before step S204.

The margin amount setting section 114 sets the size of the margins MG based on at least one out of the state of the vehicle M (speed, acceleration, or the like), the states of the nearby vehicles mA, mB, mC (speed, acceleration, behavior, or the like), the sizes of the nearby vehicles mA, mB, mC (vehicle width, vehicle class, or the like), or the environment in which the vehicle M is traveling (lane category, road gradient, tightness of curve, weather conditions, road surface conditions, visibility conditions, or the like) that have been detected by the detection section DT.

Detailed explanation now follows regarding a setting method for the size of the vehicle-in-front rearward margin MGA.

For example, the margin amount setting section 114 of the present embodiment sets the size of the vehicle-in-front rearward margin MGA based on at least one out of the speed of the vehicle M, the speed of the vehicle in front mA, and the relative speed between the vehicle M and the vehicle in front mA. For example, the margin amount setting section 114 sets the size of the vehicle-in-front rearward margin MGA based on either, or a combination of, a time-to-collision TTC of the vehicle M with respect to the vehicle in front mA and a Time-Headway THW of the vehicle M with respect to the vehicle in front mA. Note that the time-to-collision TTC is a value obtained by dividing the inter-vehicle distance between the vehicle M and the vehicle in front mA in the direction of vehicle progress d by the relative speed between the vehicle M and the vehicle in front mA. The time-headway THW is a value obtained by dividing the inter-vehicle distance between the vehicle M and the vehicle in front mA in the direction of vehicle progress d by the speed of the vehicle M.

The margin amount setting section 114 also sets the size of the vehicle-in-front rearward margin MGA based on a vehicle width direction movement amount of the vehicle M required in order to change lanes avoiding the vehicle in front mA. Note that in the present disclosure, setting the size of a margin based on a specific factor is not limited to setting the size of the margin based on that factor alone, and encompasses setting the size of the margin based on other factors in addition to that factor. For example, "setting the size of the vehicle-in-front rearward margin MGA based on the vehicle width direction movement amount" is not limited to cases in which the size of the vehicle-in-front rearward margin MGA is set based on the vehicle width direction movement amount alone, and encompasses cases in which the size of the vehicle-in-front rearward margin MGA is set in consideration of the vehicle width direction movement amount together with other factors (for example, the time-to-collision TTC and the time-headway THW). Note that the same applies to other factors concerning setting of the margins MG.

Figure 8A:
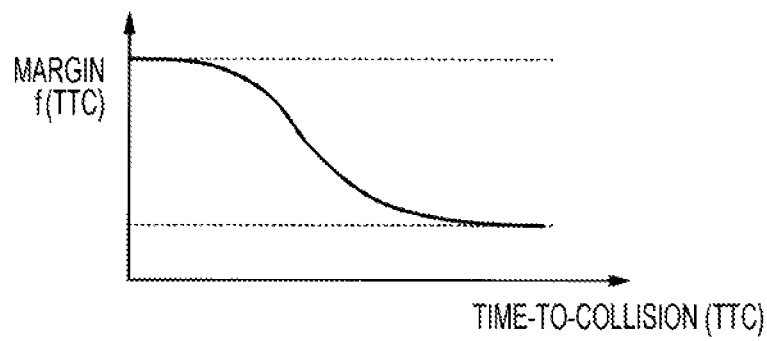
FIG. 8A is a diagram illustrating an example of a relationship between a time-to-collision and a margin amount derived based on this factor.
Figure 8B:
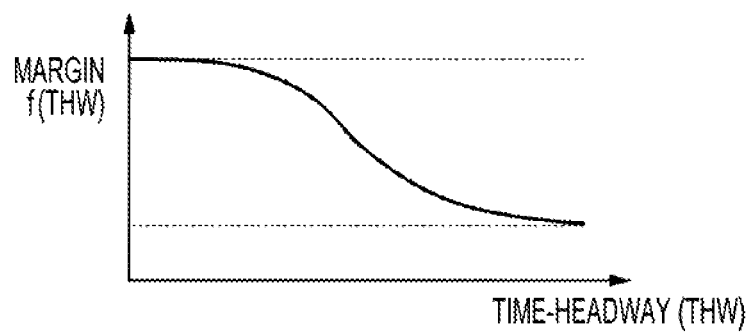
FIG. 8B is a diagram illustrating an example of a relationship between a time-headway and a margin amount derived based on this factor.
Figure 8C:
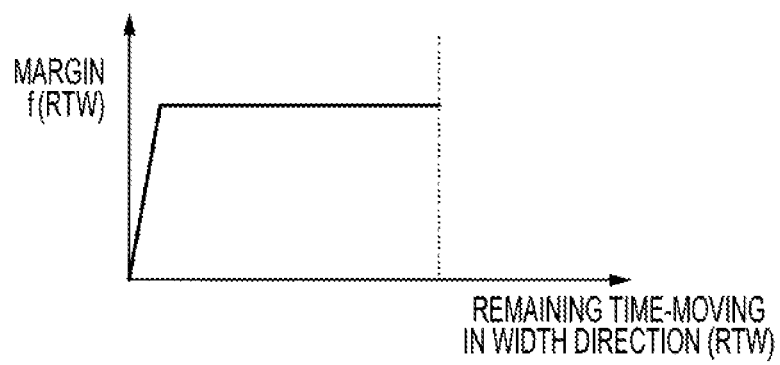
FIG. 8C is a diagram illustrating an example of a relationship between a vehicle width direction movement amount and a margin amount derived based on this factor.

FIG. 8A to FIG. 8C are diagrams illustrating examples of relationships between time-to-collision TTC, time-headway THW, vehicle width direction movement amount, and margin amounts derived based on these factors.

FIG. 8A illustrates an example of a relationship between the time-to-collision TTC and margin amounts derived based on the time-to-collision TTC (referred to as a first margin amount hereafter). As illustrated in FIG. 8A, for example, the greater the time-to-collision TTC, the smaller the first margin amount.

FIG. 8B illustrates an example of a relationship between the time-headway THW and margin amounts derived based on the time-headway THW (referred to as a second margin amount hereafter). As illustrated in FIG. 8B, for example, the greater the time-headway THW, the smaller the second margin amount.

FIG. 8C illustrates an example of a relationship between Remaining Time-moving in Width direction RTW, corresponding to a required vehicle width direction movement amount of the vehicle M in order to change lanes avoiding the vehicle in front mA, and margin amounts derived based on the remaining time-moving in width direction RTW (referred to as a third margin amount hereafter). Note that the remaining time-moving in width direction RTW is the remaining time required for the vehicle M to move in the vehicle width direction in order to avoid the vehicle in front mA. For example, the remaining time-moving in width direction RTW is derived based on the vehicle width of the vehicle in front mA, the relative positions of the vehicle in front mA and the vehicle M in the vehicle width direction, the relative speed between the vehicle in front mA and the vehicle M in the vehicle width direction, and the like, as detected by the detection section DT. As illustrated in FIG. 8C, for example, the third margin amount becomes a preset constant value when the large remaining time-moving in width direction RTW is reasonably large.

Note that the first margin amount, the second margin amount, and the third margin amount are not limited to the examples illustrated in FIG. 8A to FIG. 8C, and may be derived based on various mathematical functions, or based on preset tables.

Figure 9:
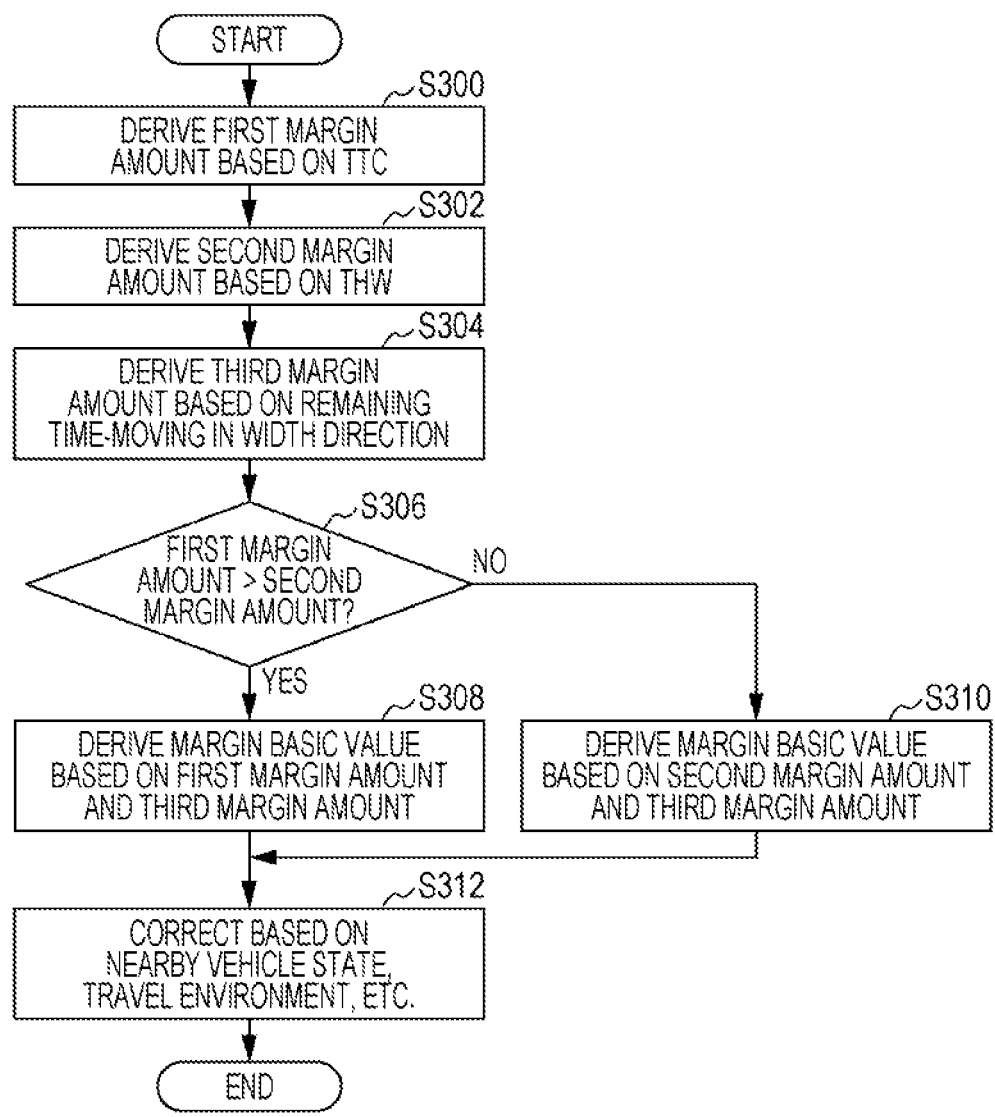
FIG. 9 is a flowchart illustrating an example of a flow when a margin amount setting section sets the size of a vehicle-in-front rearward margin in the first embodiment.

FIG. 9 is a flowchart illustrating an example of a flow when setting the size of the vehicle-in-front rearward margin MGA. As illustrated in FIG. 9, first, the margin amount setting section 114 derives the first margin amount based on the time-to-collision TTC (step S300). For example, the margin amount setting section 114 derives the first margin amount employing the function illustrated in FIG. 8A. Next, the margin amount setting section 114 derives the second margin amount based on the time-headway THW (step S302). For example, the margin amount setting section 114 derives the second margin amount employing the function illustrated in FIG. 8B. Next, the margin amount setting section 114 derives the third margin amount based on the remaining time-moving in width direction RTW (step S304). For example, the margin amount setting section 114 derives the third margin amount employing the function illustrated in FIG. 8C. Note that step S300, step S302, and step S304 may be performed at substantially the same time as each other, or any one of these steps may be performed first.

The margin amount setting section 114 of the present embodiment compares the first margin amount against the second margin amount, and sets the size of the vehicle-in-front rearward margin MGA based on the larger out of the first margin amount and the second margin amount.

More specifically, first, the margin amount setting section 114 compares the derived first margin amount and second margin amount against each other (step S306). Then, if the first margin amount is larger than the second margin amount (step S306: YES), the margin amount setting section 114 adds the third margin amount to the first margin amount, and sets the total value of the first margin amount and the third margin amount as a basic value of the vehicle-in-front rearward margin MGA (step S308). However, if the first margin amount is the same as or less than the second margin amount (step S306: NO), the margin amount setting section 114 adds the third margin amount to the second margin amount, and derives the total value of the second margin amount and the third margin amount as the basic value of the vehicle-in-front rearward margin MGA (step S310).

Namely, taking the first margin amount as f (TTC), the second margin amount as f (THW), and the third margin amount as f (RTW), a basic value BV of the vehicle-in-front rearward margin MGA is expressed as in Equation (1).

$$BV=\max\{f(TTC), f(THW)\}+f(RTW) \qquad \text{Equation (1)}$$

Moreover, the margin amount setting section 114 of the present embodiment corrects the basic value of the derived vehicle-in-front rearward margin MGA based on at least one out of the state (behavior or the like) of the nearby vehicles mA, mB, mC, the size (vehicle class or the like) of the nearby vehicles mA, mB, mC, or the environment in which the vehicle M is traveling (lane category, road gradient, tightness of curve, weather conditions, road surface conditions, visibility conditions, or the like), as detected by the detection section DT (step S312).

For example, the margin amount setting section 114 changes the size of the vehicle-in-front rearward margin MGA based on the behavior of the vehicle in front mA detected by the detection section DT. For example, when the vehicle in front mA has an unstable traveling state (such as cases in which the frequency of vehicle width direction movement is greater than a predetermined threshold value, or cases in which the frequency of brake operation (frequency of deceleration) is greater than a predetermined threshold value), the margin amount setting section 114 changes the size of the vehicle-in-front rearward margin MGA so as to increase the size of the vehicle-in-front rearward margin MGA.

Moreover, in cases in which the vehicle class of the vehicle in front mA detected by the detection section DT is larger than a specific preset size, the margin amount setting section 114 changes the vehicle-in-front rearward margin MGA so as to increase the size of the vehicle-in-front rearward margin MGA. This thereby enables an occupant of the vehicle M to be suppressed from feeling uncomfortably close due to getting too close to the large-class vehicle in front mA. Note that the margin amount setting section 114 may, for example, set a comparatively large vehicle-in-front rearward margin MGA in cases in which the vehicle class of the vehicle M is larger than a specific size, based on information relating to the vehicle class of the vehicle M stored in the storage section 130. This thereby enables an occupant of the vehicle M to be suppressed from feeling uncomfortably close.

Moreover, the margin amount setting section 114 changes the size of the vehicle-in-front rearward margin MGA based on a magnitude relationship of the average speed of vehicles traveling in the current lane L1 and the average speed of vehicles traveling in the adjacent lane L2, as detected by the detection section DT (or based on the lane categories of the current lane L1 and the adjacent lane L2, as detected by the detection section DT). For example, the margin amount setting section 114 changes the size of the vehicle-in-front rearward margin MGA so as to increase the size of the vehicle-in-front rearward margin MGA in cases in which the average speed of vehicles traveling in the adjacent lane L2 is greater than the average speed of vehicles traveling in the current lane L1 (in cases in which the current lane L1 is a traveling lane, and the adjacent lane L2 is a passing lane).

Moreover, the margin amount setting section 114 changes the size of the vehicle-in-front rearward margin MGA based on the environment in which the vehicle M is traveling (road gradient, tightness of curve, weather conditions, road surface conditions, visibility conditions, or the like), as detected by the detection section DT.

For example, the margin amount setting section 114 changes the size of the vehicle-in-front rearward margin MGA so as to increase the size of the vehicle-in-front rearward margin MGA in cases in which the road gradient or the tightness of curve are greater than preset threshold values. Moreover, the margin amount setting section 114 determines whether or not the weather conditions, road surface conditions, visibility conditions, or the like include conditions that would increase the braking distance of the vehicle M. The margin amount setting section 114 changes the size of the vehicle-in-front rearward margin MGA so as to increase the size of the vehicle-in-front rearward margin MGA in cases in which the weather conditions, road surface conditions, visibility conditions, or the like include conditions that would increase the braking distance of the vehicle M. For example, the margin amount setting section 114 changes the size of the vehicle-in-front rearward margin MGA so as to increase the size of the vehicle-in-front rearward margin MGA in rainy or snowy conditions, in conditions in which there is a possibility of ice on the road surface, or in conditions in which visibility is poor.

Explanation has been given regarding an example of a method for setting the size of the vehicle-in-front rearward margin MGA. Note that the setting methods of the front-reference-vehicle rearward margin MGB and the rear-reference-vehicle forward margin MGC are substantially the same as the setting method for the size of the vehicle-in-front rearward margin MGA. For example, with regards to the setting method for the front-reference-vehicle rearward margin MGB and the rear-reference-vehicle forward margin MGC, the foregoing explanation of the setting method for the size of the vehicle-in-front rearward margin MGA may be read substituting "vehicle in front mA" for "front reference vehicle mB" or "rear reference vehicle mC", and substituting "vehicle-in-front rearward margin MGA" for "front-reference-vehicle rearward margin MGB" or "rear-reference-vehicle forward margin MGC". Note that when setting the front-reference-vehicle rearward margin MGB and the rear-reference-vehicle forward margin MGC, the front-reference-vehicle rearward margin MGB and the rear-reference-vehicle forward margin MGC are derived by virtually placing the vehicle M in the target area TA.

Boundary Position Derivation

Next, the boundary position derivation section 115 derives boundary positions for the vehicle M provided with the margins MG, for the current point in time (t0) and at plural future points in time (t1, t2, t3, . . . ), with respect to the positions of the nearby vehicles mA, mB, mC at the current point in time (t0) and at the plural future points in time (t1, t2, t3, . . . ) as predicted by the other vehicle position change prediction section 113 (step S208).

For example, as illustrated in FIG. 7, the boundary position derivation section 115 derives, as the boundary positions, a current-lane front boundary position, an adjacent-lane front boundary position, and an adjacent-lane rear boundary position. The current-lane front boundary position is a boundary position of the vehicle M provided with the vehicle-in-front rearward margin MGA at the current point in time and at the plural future points in time, and is situated behind the respective positions of the vehicle in front mA at the current point in time and at the plural future points in time. The current-lane front boundary position is shown by the solid line rA in FIG. 7. In other words, the solid line rA is shifted from the dashed line eA toward the side encroaching on the lane change target area TA, by an amount corresponding to the vehicle-in-front rearward margin MGA. Similarly, the adjacent-lane front boundary position is a boundary position of the vehicle M provided with the front-reference-vehicle rearward margin MGB at the current point in time and at the plural future points in time, and is provided behind the position of the front reference vehicle mB at the current point in time and at the plural future points in time. The adjacent-lane front boundary position is shown by the solid line rB in FIG. 7. In other words, the solid line rB is shifted from the dashed line eB toward the side encroaching on the target area TA by an amount corresponding to the front-reference-vehicle rearward margin MGB. The adjacent-lane rear boundary position is a boundary position of the vehicle M provided with the rear-reference-vehicle forward margin MGC at the current point in time and at plural future points in time, and is provided in front of the position of the rear reference vehicle mC at the current point in time and at the plural future points in time. The adjacent-lane rear boundary position is shown by the solid line rC in FIG. 7. In other words, the solid line rC is shifted from the dashed line eC toward the side encroaching on the target area TA by an amount corresponding to the rear-reference-vehicle forward margin MGC. A region enclosed by the solid lines rA, rB, rC forms the enterable region of the vehicle M at the current point in time and at the plural future points in time. Note that although the current-lane front boundary position, the adjacent-lane front boundary position, and the adjacent-lane rear boundary position are schematically represented by the solid lines rA, rB, rC in FIG. 7, in reality, they are collections of plural points along the solid lines rA, rB, rC.

Target Course Generation

Next, the course generation section 116 generates a target course for changing lanes, based on the boundary positions (the current-lane front boundary position, the adjacent-lane front boundary position, and the adjacent-lane rear boundary position) of the vehicle M at the current point in time and at the plural future points in time, derived by the boundary position derivation section 115 (step S210). In other words, the course generation section 116 determines the speed, acceleration, and the like of the vehicle M at the plural future points in time (t1, t2, t3, . . . ) in order to move the vehicle M into the enterable region defined by the boundary positions (the current-lane front boundary position, the adjacent-lane front boundary position, and the adjacent-lane rear boundary position). For example, the course generation section 116 generates future target positions such as K(1), K(2), K(3), . . . , as the target course of the vehicle M each time a specific amount of time Δt has passed, starting from the current point in time, and using the current position of the vehicle M as a reference.

Travel Control

The travel control section 120 sets the control mode to either the self-driving mode or the manual driving mode under the control of the control switching section 122, and controls a control target in accordance with the set control mode. When in the self-driving mode, the travel control section 120 reads action plan information 136 generated by the action plan generation section 106, and controls the control target based on events included in the read action plan information 136. When the event is a lane change event, the travel control section 120 determines a control amount (for example a revolution speed) of the electric motor of the steering device 92, and determines an ECU control amount (for example a throttle opening amount of the engine and a shift gear) of the traveling drive force output device 90, according to the target course generated by the course generation section 116. The travel control section 120 outputs information indicating the control amounts determined for each event to the corresponding control targets. Accordingly, the respective control target devices (90, 92, 94) can control themselves according to the information indicating control amounts input from the travel control section 120. Moreover, the travel control section 120 adjusts the determined control amounts as appropriate based on the detection results of the vehicle sensors 60.

Moreover, the travel control section 120 controls the control targets based on operation detection signals output by the operation detection sensors 72 when in the manual driving mode. For example, the travel control section 120 outputs operation detection signals output from the operation detection sensors 72 to the respective control target devices as they are.

The control switching section 122 switches the control mode of the vehicle M by the travel control section 120 from the self-driving mode to the manual driving mode, or from the manual driving mode to the self-driving mode, based on the action plan information 136 generated by the action plan generation section 106. The control switching section 122 also switches the control mode of the vehicle M by the travel control section 120 from the self-driving mode to the manual driving mode, or from the manual driving mode to the self-driving mode, based on the control mode designation signals input from the switch 80. Namely, the control mode of the travel control section 120 may be changed as desired by driver operation or the like, during travel or when the vehicle is stationary.

The control switching section 122 also switches the control mode of the vehicle M by the travel control section 120 from the self-driving mode to the manual driving mode based on operation detection signals input from the operation detection sensors 72. For example, the control switching section 122 switches control mode of the travel control section 120 from the self-driving mode to the manual driving mode when an operation amount included in the operation detection signals exceeds a threshold value, namely when an operation with an operation amount exceeding a threshold value has been received by one of the operation devices 70. For example, during autonomous travel of the vehicle M by the travel control section 120 that has been set to the self-driving mode, when the steering wheel, accelerator pedal, or brake pedal are operated by a driver by an operation amount exceeding the threshold value, the control switching section 122 switches the control mode of the travel control section 120 from the self-driving mode to the manual driving mode. This thereby enables the vehicle control system 100 to switch immediately to the manual driving mode, without requiring operation of the switch 80, in response to sudden operation by the driver when, for example, an object such as a person dashes out into the road, or the vehicle in front comes to a sudden stop. As a result, the vehicle control system 100 is capable of responding to emergency operation by the driver, thereby enabling an increase in travel safety.

According to the vehicle control system 100 of the present embodiment described above, a lane change target course is generated based on the boundary positions provided by the margins MG with respect to the positions of the nearby vehicles at the plural future points in time. This thereby enables the target course to be generated with more leeway at the plural future points in time, enabling a further increase in lane changing safety.

Moreover, according to the vehicle control system 100 of the present embodiment, appropriate boundary positions are set behind the vehicle in front mA in the current lane L1, behind the front reference vehicle mB in the adjacent lane L2, and ahead of the rear reference vehicle mC in the adjacent lane L2. This thereby enables a target course to be generated with more leeway with respect to the various nearby vehicles mA, mB, mC traveling in the current lane and the adjacent lane, thus enabling a further increase in lane changing safety.

According to the vehicle control system 100 of the present embodiment, the sizes of the margins MG are set based on at least one out of the state of the vehicle M (speed, acceleration, or the like), the state of the nearby vehicles (speed, acceleration, behavior, or the like), the size of the nearby vehicles (vehicle width, vehicle class, or the like), and the environment in which the vehicle M is traveling (lane category, road gradient, tightness of curve, weather conditions, road surface conditions, visibility conditions, or the like). Accordingly, the sizes of the margins MG are set flexibly depending on various conditions, and a safer target course is generated. For example, setting a larger margin MG when the behavior of a nearby vehicle is erratic enables safety to be further increased. Moreover, setting a larger margin MG when a nearby vehicle has a large vehicle class enables an occupant of the vehicle M to be suppressed from feeling uncomfortably close, for example. Moreover, a larger margin MG can be set when changing lanes into the adjacent lane L2 where the average speed is higher than in the current lane L1. For example, in such cases, setting a comparatively large rear-reference-vehicle forward margin MGC enables a further increase in safety should the rear reference vehicle mC increase in speed. Moreover, setting a larger margin in cases in which the gradient or curvature of the road are comparatively severe enables a further increase in safety. Moreover, setting a larger margin in weather conditions, road surface conditions, visibility conditions, or the like that are likely to increase the braking distance enables a further increase in safety.

Moreover, according to the vehicle control system 100 of the present embodiment, the first margin amount is derived based on the time-to-collision TTC, the second margin amount is derived based on the time-headway THW, and the size of the margin MG is set based on at least one out of the first margin amount and the second margin amount. Note that the time-to-collision TTC is a different concept to the time-headway THW, and so it is conceivable that depending on the vehicle speed of the vehicle M and the nearby vehicles, and the relative speeds between them, the first margin amount derived based on the time-to-collision TTC could be larger than the second margin amount derived based on the time-headway THW, or conversely, that the second margin amount could be larger than the first margin amount. Accordingly, the vehicle control system 100 of the present embodiment derives both the first margin amount and the second margin amount, and sets the size of the margins MG so as to cover at least the larger of the first margin amount and the second margin amount. This thereby enables a further increase in safety in various situations of the vehicle M and the nearby vehicles.

Note that the setting method for the size of the margins MG is not limited to the example given in the present embodiment.

For example, after deriving the first margin amount and the second margin amount, the margin amount setting section 114 may derive the total value of the value of a preset first coefficient $\alpha_1$ multiplied by the first margin amount and the value of a preset second coefficient $\alpha_2$ multiplied by the second margin amount (namely, a weighted sum of the first margin amount and the second margin amount) as the basic value of the vehicle-in-front rearward margin MGA.

Namely, taking the first margin amount as f (TTC), the second margin amount as f (THW), and the third margin amount as f (RTW), the basic value BV of the vehicle-in-front rearward margin MGA may be derived as in Equation (2).

$$BV = \alpha_1 \times f(TTC) + \alpha_2 \times f(RTW) \quad \text{Equation (2)}$$

Such a setting method again enables the size of the margin MG to be set in consideration of both the first margin amount and the second margin amount as appropriate. Note that the first coefficient $\alpha_1$ and the second coefficient $\alpha_2$ may each be "1".

Moreover, according to the vehicle control system 100 of the present embodiment, the size of the margin MG is set based on the vehicle width direction movement amount of the vehicle M required in order to avoid the vehicle in front mA traveling immediately ahead of the vehicle M in the current lane L1. This thereby enables appropriate consideration to be given to the vehicle width direction movement amount of the vehicle M even in cases in which, for example, the position of the vehicle M is modeled using a single point such as the center of mass of the vehicle M, and thus enables a further increase in safety.

Second Embodiment

Figure 10:
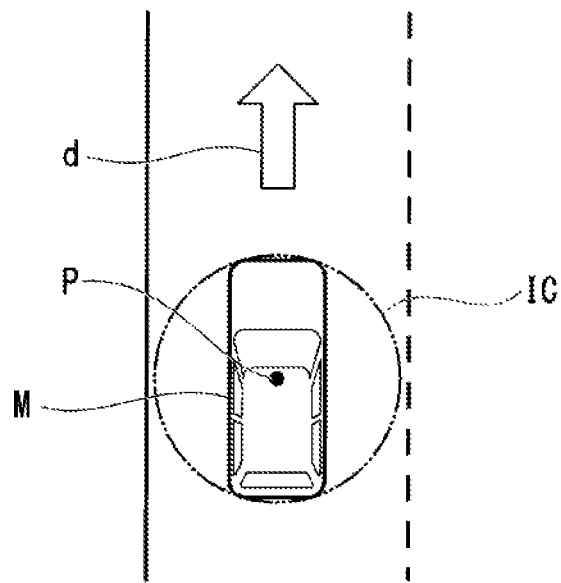
FIG. 10 is a plan view illustrating a vehicle reference point recognized by a vehicle control system in a second embodiment.

Explanation follows regarding a second embodiment. FIG. 10 is a plan view illustrating a reference point P of the vehicle M as recognized by a vehicle control system 100 according to the second embodiment. As illustrated in FIG. 10, the vehicle control system 100 according to the second embodiment treats the position of the vehicle M as a single point mass, and sets the size of the margins MG based on margin amounts derived based on the concept of a Minkowski sum. The following explanation focuses on these points of difference.

FIG. 10 illustrates the basic concept of a Minkowski sum. According to the basic concept of a Minkowski sum, the vehicle M is treated at a reference point (point mass) P, and an imaginary circle IC is centered on the reference point P. The imaginary circle IC is set to a size that surrounds the external profile of the vehicle M. The vehicle M is determined to have contacted a nearby vehicle if the distance between the vehicle M and the nearby vehicle is smaller than the radius of the imaginary circle IC.

The margin amount setting section 114 of the present embodiment sets the sizes of the vehicle-in-front rearward margin MGA, the front-reference-vehicle rearward margin MGB, and the rear-reference-vehicle forward margin MGC based on a distance corresponding to the radius of the imaginary circle IC. For example, the margin amount setting section 114 sets the size of the vehicle-in-front rearward margin MGA, the front-reference-vehicle rearward margin MGB, and the rear-reference-vehicle forward margin MGC by adding the distance corresponding to the radius of the imaginary circle IC to the basic value of the vehicle-in-front rearward margin MGA, the front-reference-vehicle rearward margin MGB, and the rear-reference-vehicle forward margin MGC. This thereby enables a precise margin MG to be set, even when the vehicle M is treated as a single reference point P.

Next, explanation follows regarding a first modified example of the second embodiment.

Figure 11:
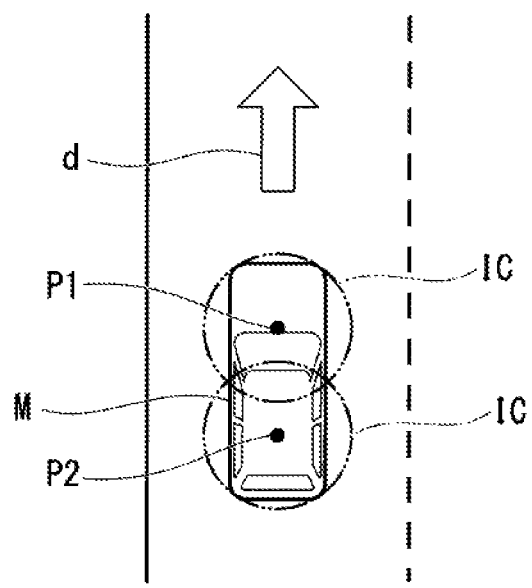
FIG. 11 is a plan view illustrating vehicle reference points recognized by a vehicle control system in a first modified example of the second embodiment.

FIG. 11 is a plan view illustrating reference points P1, P2 of the vehicle M as recognized by a vehicle control system 100 according to the first modified example of the second embodiment.

In general, vehicles have a profile in which the length in the direction of vehicle progress d is greater than the vehicle width. Accordingly, there are cases in which an imaginary circle IC centered on the single reference point P set for the vehicle M cannot be said to precisely reflect the external profile of the vehicle.

Accordingly, as illustrated in FIG. 11, the vehicle position recognition section 104 of the vehicle control system 100 of the present modified example considers the position of the vehicle M as two reference points (point masses) P1, P2, disposed separated from each other in the direction of vehicle progress d, and two imaginary circles IC are centered on the two reference points P1, P2. For example, the reference point P1 is positioned at the front side of the reference point P2 in the direction of vehicle progress d.

FIG. 12A and FIG. 12B are diagrams illustrating examples of relationships between the reference points P1, P2 of the vehicle M and the nearby vehicles mA, mB, mC at the current point in time (t0) and at the plural future points in time (t1, t2, t3, . . . ). In FIG. 12A, the two reference points P1, P2 are illustrated separately to each other, and the position of the reference point P2 at the current point in time (t0) is at zero. However, FIG. 12B illustrates a case in which the two reference points P1, P2 are virtually combined.

As illustrated in FIG. 12A, in the present embodiment, the current-lane front boundary position (solid line rA) and the adjacent-lane front boundary position (solid line rB) are set as boundary positions with respect to the reference point P1 of the vehicle M. In such cases, the sizes of the vehicle-in-front rearward margin MGA and the front-reference-vehicle rearward margin MGB are set based on a distance corresponding to the radius of the imaginary circle IC centered on the reference point P1. However, the adjacent-lane rear boundary position (solid line rC) is set as a boundary position with respect to the reference point P2 of the vehicle M. In such cases, the rear-reference-vehicle forward margin MGC is set based on a distance corresponding to the radius of the imaginary circle IC centered on the reference point P2.

In the present modified example, the profile of the vehicle M can be recognized more precisely when the two reference points P1, P2 are set than when a single reference point is set. Accordingly, the respective sizes of the vehicle-in-front rearward margin MGA, the front-reference-vehicle rearward margin MGB, and the rear-reference-vehicle forward margin MGC of the present embodiment are capable of securing a high level of safety even if the respective sizes of the vehicle-in-front rearward margin MGA, the front-reference-vehicle rearward margin MGB, and the rear-reference-vehicle forward margin MGC are set smaller than they would be if using a single reference point.

When generating the lane change target course in the present modified example, the target course may be generated by calculating how much the boundary position is encroached on, based on each of the two reference points P1, P2 of the vehicle M, such that the two reference points P1, P2 of the vehicle M respectively enter the enterable region. Note that in such cases, since it is necessary to make calculations for each of the two reference points P1, P2, the processing load when calculating for course generation may increase.

Accordingly, the course generation section 116 of the present modified example sets a single virtually combined PA using the two reference points P1, P2 of the vehicle M, and generates a target course such that the PA enters the enterable region. For example, as illustrated in FIG. 12B, the course generation section 116 moves the reference point P1 such that the reference point P1 and the reference point P2 overlap, and adds a margin amount MS corresponding to the distance between the reference point P1 and the reference point P2 to the vehicle-in-front rearward margin MGA and the front-reference-vehicle rearward margin MGB. This thereby enables an appropriate lane change target course to be generated by generating a target course for the single combined reference point PA. This thereby enables the processing load when calculating for lane change to be reduced.

Note that the reference points set for the vehicle M are not limited to the above examples.

Figure 13:
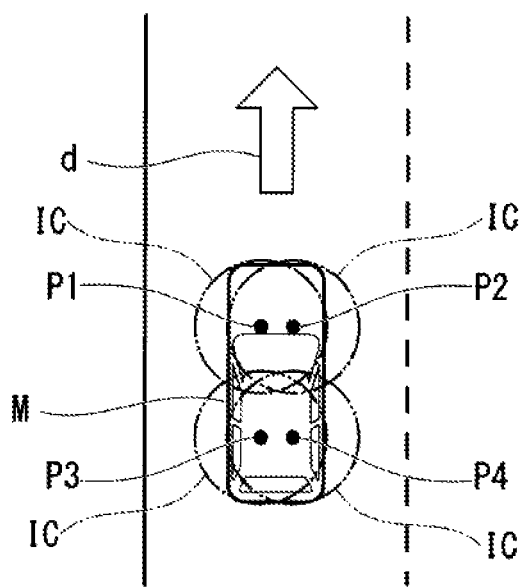
FIG. 13 is a plan view illustrating vehicle reference points recognized by a vehicle control system in a second modified example of the second embodiment.

For example, FIG. 13 illustrates a case in which, as a second modified example of the second embodiment, four reference points P1, P2, P3, P4 are set for the vehicle M. The reference points P1, P2 are disposed at the front side of the reference points P3, P4 in the direction of vehicle progress d. For example, the reference points P1, P2 are disposed at the same position as each other in the direction of vehicle progress d. For example, the reference points P3, P4 are disposed at the same position as each other in the direction of vehicle progress d.

In such a configuration, adding an appropriate margin amount to the margin MG enables the plural reference points P1, P2, P3, P4 to be synthesized into a single reference point PA in order to generate a target course.

Explanation has been given regarding embodiments for implementing the present disclosure. However, the present disclosure is in no way limited to these embodiments, and various modifications or substitutions may be implemented within a range that does not depart from the spirit of the present disclosure.

For example, the size of the margin MG may be a preset fixed constant value irrespective of the time-to-collision TTC and the time-headway THW, or may be a value derived based only on the environment and the like in which the vehicle M is traveling.

What is claimed is:

1. A vehicle control system configured to control a subject vehicle to change lanes from a current lane in which the subject vehicle is traveling to a target area in an adjacent lane by generating a lane change target area in the adjacent lane and a target course to the target area, the system comprising:
    a detection section configured to detect a nearby vehicle traveling in a vicinity of the subject vehicle;
    a prediction section configured to predict future positions of the detected nearby vehicle at a plurality of future points in time;
    a derivation section configured to derive future boundary positions for the subject vehicle at the plurality of future points in time so as to restrict an area for the lane change target area to generate, the future boundary positions defining a margin area on a side of the lane change target area from the future positions of the nearby vehicle predicted by the prediction section for the plurality of future points in time; and
    a course generation section configured to generate the target course for the subject vehicle to travel to change lanes based on the future boundary positions of the subject vehicle derived by the derivation section for the plurality of future points in time such that the target course is generated outside the margin area,
    wherein the vehicle control system is configured to control the subject vehicle to perform the lane change according to the target course generated by the course generation section.

2. The vehicle control system according to claim 1, wherein
    the detection section detects as the nearby vehicle each of a vehicle in front traveling immediately ahead of the subject vehicle in the current lane, a front reference vehicle traveling immediately ahead of the lane change target area in the adjacent lane, and a rear reference vehicle traveling immediately behind the lane change target area in the adjacent lane,
    as the boundary positions, the derivation section derives current-lane front boundary positions which define a vehicle-in-front rearward margin area at a rear side of positions at the plurality of future points in time of the vehicle in front traveling immediately ahead of the subject vehicle in the current lane,
    adjacent-lane front boundary positions which define a front-reference-vehicle rearward margin area at a rear side of positions at the plurality of future points in time for the front reference vehicle traveling immediately ahead of the lane change target area in the adjacent lane adjacent to the current lane, and
    adjacent-lane rear boundary positions which define a rear-reference-vehicle forward margin area at a front side of positions at the plurality of future points in time of the rear reference vehicle traveling immediately behind the lane change target area in the adjacent lane, and
    the course generation section generates the target course based on the current-lane front boundary position, the adjacent-lane front boundary position, and the adjacent-lane rear boundary position derived by the derivation section.

3. The vehicle control system according to claim 1, wherein the detection section is further configured to detect a state of the subject vehicle and a state of the nearby vehicle, the system further comprising:
a margin size setting section configured to set a size of the margin area based on at least one of the state of the subject vehicle or the state of the nearby vehicle, and wherein
the derivation section derives the boundary position for the subject vehicle at the plurality of future points in time by providing the margin area at the size set by the margin size setting section.

4. The vehicle control system according to claim 3, wherein the margin size setting section sets the size of the margin area based on at least one of a speed of the subject vehicle, a speed of the nearby vehicle, or a relative speed between the subject vehicle and the nearby vehicle.

5. The vehicle control system according to claim 4, wherein the margin size setting section is configured to:
derive a first margin size based on a time-to-collision obtained by dividing an inter-vehicle distance between the subject vehicle and the nearby vehicle in a traveling direction thereof by the relative speed;
derive a second margin size based on a time-headway obtained by dividing the inter-vehicle distance between the subject vehicle and the nearby vehicle in the traveling direction thereof by the speed of the subject vehicle; and
set the size of the margin area based on at least one of the first margin size or the second margin size.

6. The vehicle control system according to claim 5, wherein the margin size setting section compares the first margin size against the second margin size, and sets the size of the margin area based on whichever is the larger out of the first margin size or the second margin size.

7. The vehicle control system according to claim 5, wherein the margin size setting section sets the size of the margin area based on a weighted sum of the first margin size and the second margin size.

8. The vehicle control system according to claim 3, wherein the margin size setting section sets the size of the margin area based on a vehicle width direction movement size for the subject vehicle to avoid the vehicle in front traveling immediately ahead of the subject vehicle in the current lane.

9. The vehicle control system according to claim 3, wherein the margin size setting section sets the size of the margin area based on behavior of the nearby vehicle.

10. The vehicle control system according to claim 1, further comprising a margin size setting section that sets a size of the margin area based on a vehicle class of the nearby vehicle, wherein
the derivation section derives the boundary positions of the subject vehicle at the plurality of future points in time by providing the margin area at the size set by the margin size setting section.

11. The vehicle control system according to claim 1, further comprising a margin size setting section that sets a size of the margin area based on an environment in which the subject vehicle is traveling; and wherein
the derivation section derives the boundary positions for the subject vehicle at the plurality of future points in time by providing the margin area at the size set by the margin size setting section.

12. The vehicle control system according to claim 11, wherein the margin size setting section sets the size of the margin area based on a magnitude relationship between an average speed in the current lane, and an average speed in the adjacent lane adjacent to the current lane.

13. A vehicle control method performed by a vehicle computer to control a subject vehicle to change lanes from a current lane in which the subject vehicle is traveling to a target area in an adjacent lane by generating a lane change target area in the adjacent lane and a target course to the target area, the vehicle control method comprising:
detecting a nearby vehicle traveling in a vicinity of the subject vehicle;
predicting future positions of the detected nearby vehicle at a plurality of future points in time;
deriving future boundary positions for the subject vehicle at the plurality of future points in time so as to restrict an area for the lane change target area to generate, the future boundary positions defining a margin area on a side of the lane change target area from the predicted future positions of the nearby vehicle for the plurality of future points in time; and
generating the target course for the subject vehicle to travel to change lanes based on the derived future boundary positions of the subject vehicle for the plurality of future points in time such that the target course is generated outside the margin area; and
controlling the subject vehicle to perform the lane change according to the target course generated by the course generation section.

14. A non-transitory computer readable medium storing therein a vehicle control program to control a subject vehicle to change lanes from a current lane in which the subject vehicle is traveling to a target area in an adjacent lane by generating a lane change target area in the adjacent lane and a target course to the target area, the program causing a vehicle computer to perform the steps of:
detecting a nearby vehicle traveling in a vicinity of a vehicle;
predicting future positions of the detected nearby vehicle at a plurality of future points in time;
deriving future boundary positions for the subject vehicle at the plurality of future points in time so as to restrict an area for the lane change target area to generate, the future boundary positions defining a margin area on a side of the lane change target area of the subject vehicle from the predicted future positions of the nearby vehicle for the plurality of future points in time;
generating the target course for the subject vehicle to travel to change lanes based on the derived future boundary positions of the subject vehicle for the plurality of future points in time such that the target course is generated outside the margin area; and
controlling the subject vehicle to perform the lane change according to the target course generated by the course generation section.

\* \* \* \* \*